INVENTORS
JAN WINKEL & CORNELIS VAN DER LELY

United States Patent Office 3,466,860
Patented Sept. 16, 1969

3,466,860
IMPLEMENTS FOR THE LATERAL DISPLACE-
MENT OF CROP LYING ON THE GROUND
Jan Winkel, Sassenheim, Netherlands, and Cornelis van
der Lely, Zug, Switzerland, assignors to C. van der
Lely N.V., Maasland, Netherlands, a Dutch limited-
liability company
Filed May 24, 1965, Ser. No. 458,307
Claims priority, application Netherlands, June 29, 1964,
6407352; Nov. 17, 1964, 6413347; Dec. 1, 1964,
6413928
Int. Cl. A01d 77/06
U.S. Cl. 56—377
29 Claims

ABSTRACT OF THE DISCLOSURE

A rake wheel assembly is mounted on a frame beam supported by ground wheels. One group of rake wheels is located forward and another rearward of the frame beam and each group can be raised or lowered as a group through cranks and turnable arms. The rake wheels are mounted parallel to one another on further beams that extend obliquely to the direction of travel. Hydraulic pistons can be connected to raise and lower the groups of wheels.

---

This invention relates to implements for the lateral displacement of crop lying on the ground, such implements being of the kind comprising a movable frame wholly or partly supported by ground wheels and a row of rake wheels connected to said frame.

An object of the invention is to provide simple and efficient implements of this kind.

According to the invention, there is provided an implement of the kind set forth, wherein, viewed in a horizontal direction perpendicular to the intended direction of travel of the implement, rake wheels are arranged both forwardly and rearwardly of a ground wheel of the implement whose position relative to the frame is fixed during operation of the implement, said ground wheel being of greater diameter than a further ground wheel of the implement.

For a better understanding of the invention, and to show how the same may be carried into effect, reference will now be made, by way of example, to the accompanying drawings, in which.

Figure 1:
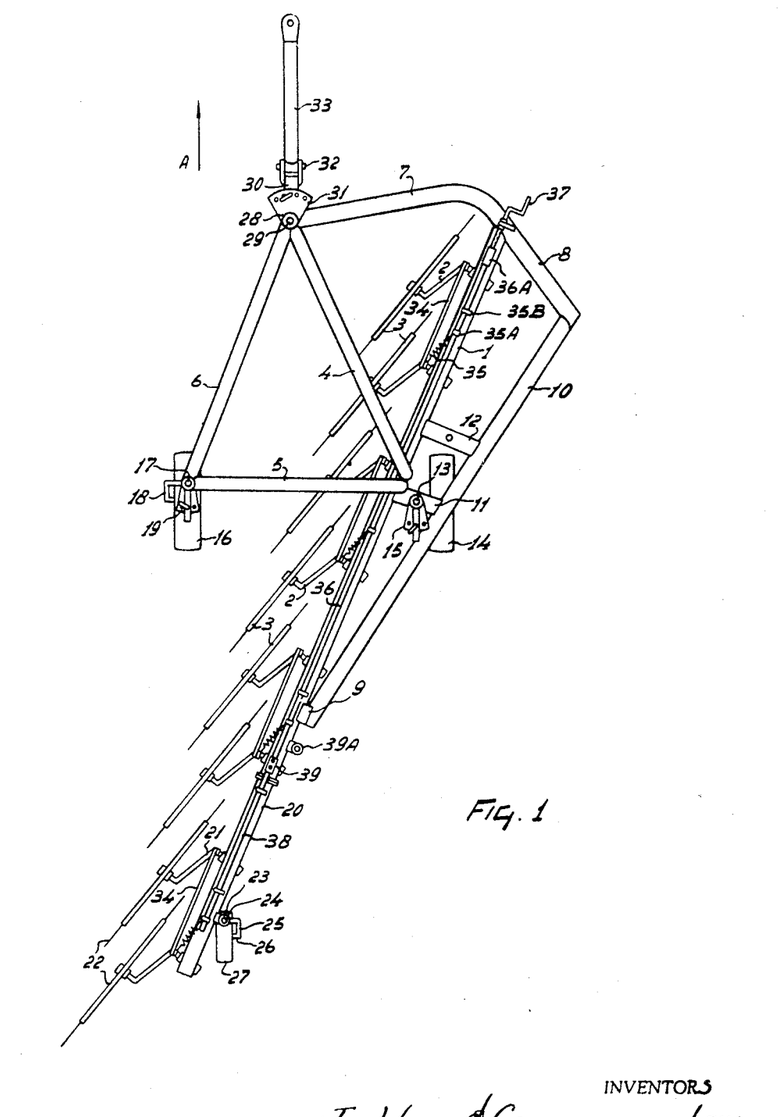
FIGURE 1 is a plan view of a raking implement in accordance with the invention.

The raking implement illustrated in FIGURE 1 of the drawings has an elongated frame beam 1 to which a row of six rake wheels 3 is connected by six cranks 2. It will be apparent that this arrangement allows each rake wheel 3 to move vertically relative to the frame beam 1 but the arrangement is such that, during normal operation of the implement on level ground, the frame beam 1 is located at the same, or approximately the same, level as as hubs of the six rake wheels 3. An upwardly arched frame beam 4 has its rearmost end, relative to the intended direction of operative travel of the implement which is indicated by the arrow A, connected to the frame beam 1 near the connection point of the crank 2 of the third rake wheel 3 of the row, said beam 4 arching forwardly over the row of rake wheels. A further upwardly arched frame beam 5 that is contained in a substantially vertical plane extending substantially perpendicular to the direction A is also arched over the row of rake wheels 3 from the same location as the rearmost end of the beam 4. The ends of the beams 4 and 5 remote from the beam 1 are interconnected by a horizontal frame beam 6 that is inclined to the direction A. A profiled frame beam 7 interconnects the leading end of the frame beam 1 and the interconnected leading ends of the two beams 4 and 6. As can be seen in FIGURE 1 of the drawings, the beam 7 has an extension 8 that projects obliquely rearwardly from the leading end of the frame beam 1 towards the side of the latter remote from the rake wheels 3. A support 9 is secured to the frame beam 1 between the connection points of the cranks 2 of the fifth and sixth rake wheels 3 of the row to that beam. The support 9 is located on the opposite side of the beam 1 to the rake wheels 3 and a frame beam 10 interconnects the support 9 and the rearmost end of the extension 8. Strengthening beams 11 and 12 interconnect the beams 1 and 10 at two locations between the extension 8 and support 9.

A vertical shaft 13 is journalled in a vertical bearing secured to the strengthening beam 11, the lowermost end of said shaft being connected to a horizontal axle upon which a ground wheel 14 is rotatably mounted. The longitudinal axis of the shaft 13 intersects the longitudinal axis of said axle and a locking member 15 is provided to enable the plane of rotation of the ground wheel 14 to be retained in chosen angular settings relative to the frame of the implement.

A second ground wheel 16 is mounted at the junction between the arched frame beam 5 and the frame beam 6 with the aid of a vertical shaft 17, an inclined connected member 18 and a locking member 19. As can be seen in FIGURE 1, the member 18 is formed in such a way that the longitudinal axis of the shaft 17 and the longitudinal axis of the axle of the ground wheel 16 do not intersect one another, so that said ground wheel is a castor wheel. The arrangement is such that, when the implement occupies the position shown in FIGURE 1, the longitudinal axes of the axles of the ground wheels 14 and 16 are coincident.

The rearmost end of the frame beam 1 relative to the direction A has a coaxial extension beam 20 releasably secured to it, said extension beam supporting two rake wheels 22 by means of corresponding cranks 21, the cranks 21 and rake wheels 22 being similar to the previously mentioned cranks 2 and rake wheels 3. The extension beam 20 carries a vertical bearing 23 in which a vertical shaft 24 is turnable, the lowermost end of the shaft 24 being linked to a horizontal axle 26 by an inclined connecting member 25. A ground wheel 27 is rotatably mounted on the axle 26 and it will be evident from FIGURE 1 that the construction of the inclined connecting member 25 is such that the longitudinal axes of the shaft 24 and the axle 26 do not intersect one another making the ground wheel 27 a castor wheel.

A vertical bearing 28 is mounted in the region of the junction between the beams 4, 6 and 7 and a vertical pivot pin 29 is lodged in said bearing. A bracket 30 is turnably mounted on the pivot pin 29, a locking member 31 being provided to enable the bracket 30 to be retained in chosen angular settings about said pivot pin relative to the frame. The end of the bracket 30 remote from the pivot pin 29 is forked, the forks carrying a horizontal pivot pin 32 about which a drawer bar 33 is turnable.

Pairs of the cranks 2 and 21 are interconnected by coupling rods 34 the opposite ends of each of which are pivotally connected to the uppermost ends of arms that project upwardly from the cranks 2 or 21 at points close to the parts of said cranks that are entered in horizontal bearings carried by the frame beam 1 or extension beam 20. The pivots at the opposite ends of each coupling rod and the axes afforded by the corresponding pair of bearings secured to the frame beam 1 or extension beam 20 are located at the four corners of a parallelogram and, as can be seen in FIGURE 1 of the drawings, each parallelogram linkage is provided with a spring 35 that extends between the uppermost and rearmost, relative to the direction A, corner of the parallelogram linkage and an anchorage point 35A on a rod 36 that is axially displaceable above, and parallel to, the frame beam 1 in eyes 35B fastened to that beam. The extension beam 20 is provided with a similar rod 38 that is releasably connected to the rearmost end of the rod 36 by a fastening 39. The leading end of the rod 36 carries an internally screw-threaded sleeve 36A in which the correspondingly screw-threaded shank of a rotatable but axially immovable crank 37 is entered. It will be evident that the rods 36 and 38 will be moved axially in one or other direction upon appropriate rotation of the crank 37.

Upon connecting the draw bar 33 to the tow bar or hitch of a tractor or other towing vehicle and moving the implement in the direction A, all the rake wheels 3 and 22 will be caused to rotate by virtue of the contact of their tines with the ground and any crop lying on the ground which said tines encounter will be laterally displaced to the left of the path of travel of the implement and will be formed in a single windrow to the left of the rearmost rake wheel 22. In other words, the implement will operate as a side-delivery rake. The pressure exerted by the tines of each rake wheel upon the ground can be adjusted by rotating the crank 37 to increase or decrease the degree of tension of each spring 35 and thus the tendency of each such spring to raise the corresponding pair of rake wheels clear of contact with the ground. The arrangement is such that the crank 37 can be caused to raise all the rake wheels completely clear of contact with the ground to allow for nonoperative transport of the implement.

The ground wheel 14 normally acts as the "steering" wheel of the implement, that is to say, the implement is used with the plane of rotation of the ground wheel 14 fixed relative to the frame of the implement. It will be noted that the diameter of the ground wheel 14 is approximately double that of the ground wheel 27 which latter ground wheel is of a conventional size for rake wheel implements. The diameter of the ground wheel 14 is about half that of the rake wheels 3 and 22 and the diameter of the second ground wheel 16 is the same as that of the wheel 14. The second ground wheel 16 can have its plane of rotation fixed to enable it to serve as a further "steering" wheel or, alternatively, it can act as a free castor wheel. The ground wheel 14 is located at a point approximately one-third of the way along the full row of eight rake wheels of the implement from the front of that row and is thus diposed wheel towards the front of the implement. This enables the implement to make sharp bends despite its greater than usual length. The large dimensions of the ground wheel 14 enable it to support a large part of the weight of the implement and are conducive to smooth travel thereof.

The row of eight rake wheels can be shortened to six by removing the extension beam 20 carrying the two rake wheels 22. This is accomplished merely by releasing the fastening 39 and the connection between the frame beam 1 and the extension beam 20. The vertical shaft 24 is withdrawn from the vertical bearing 23 and is, instead, entered in a further vertical bearing 39A secured to the frame beam 1 immediately to the rear of the support 9. The ground wheel 14 can also be moved forwardly of the implement by withdrawing the bearing and vertical shaft 13 from the strengthening beam 11 and reentering them in a hole in the beam 12.

The angular settings of the draw bar 33 and the ground wheels 14 and 16 relative to the frame can be changed to enable the working width of the implement to be adjusted to suit different working conditions and it will be apparent that one such setting of the draw bar 33 and ground wheels 14 and 16 is one in which the path of travel of the whole implement is at a minimum width. This setting is employed during nonoperative transport of the implement to enable it to negotiate gateways and other narrow passages with as little difficulty as possible. The frame of the implement is strong but relatively simple and furnishes a raking implement which can have a large working width when desired.

Figure 2:
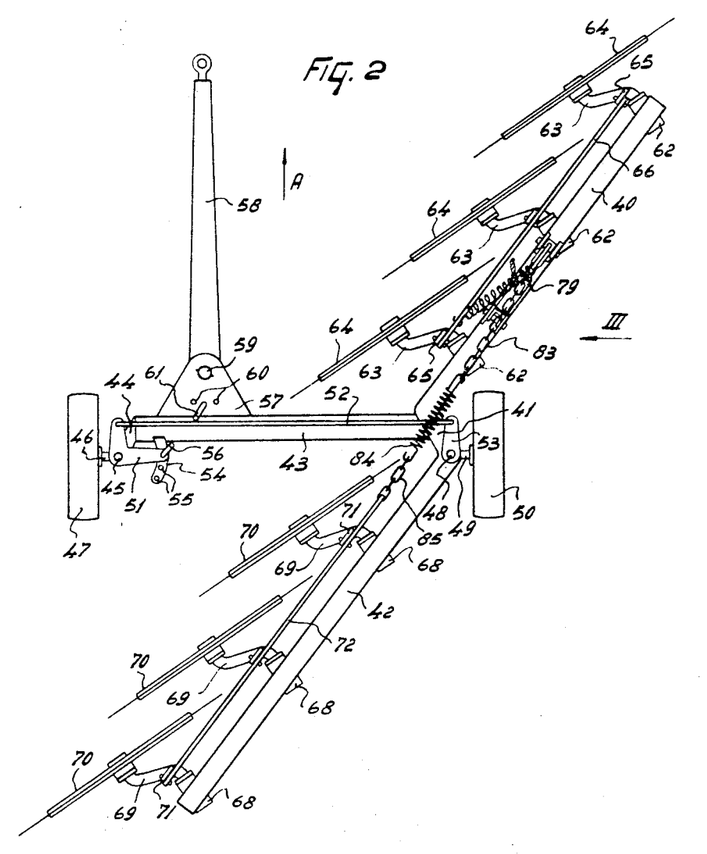
FIGURE 2 is a plan view of a second embodiment of a raking implement in accordance with the invention.
Figure 3:
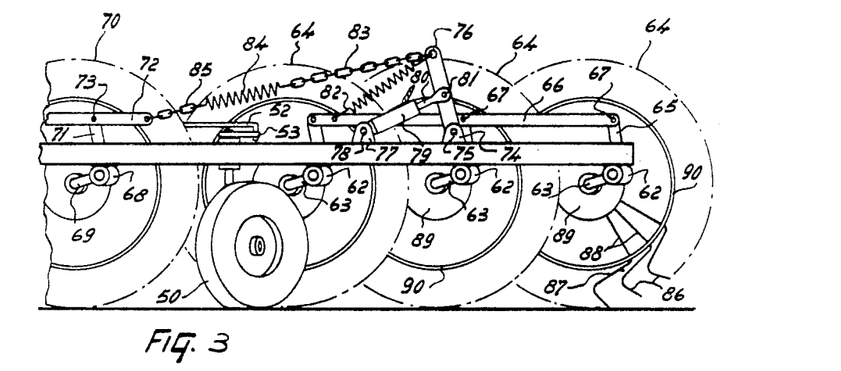
FIGURE 3 is a side elevation as seen in the direction indicated by the arrow III of FIGURE 2.

FIGURES 2 and 3 of the drawings illustrate a raking implement having a horizontal frame beam 40 and a further parallel horizontal frame beam 42, the beams 40 and 42 being interconnected by a relatively inclined part 41 from which an integral frame beam 43 projects at an angle of about 130° to the beam 40. The frame beam 43 extends substantially perpendicular to the intended direction of travel of the implement which is indicated by an arrow A in FIGURE 2 of the drawings.

The end of the beam 43 remote from the part 41 carries a rearwardly projecting arm 44 in the rearmost end of which a vertical pivot pin 45 is turnably mounted. A horizontal axle 46 is integral with the pin 45 and has a ground wheel 47 rotatably mounted thereon. A further vertical pivot pin 48 is journalled in the beam 42 at the junction of that beam with the part 41, said pin 48 being integral with a horizontal axle 49 upon which a ground wheel 50 is rotatably mounted. When the implement occupies its normal working position as illustrated in FIGURE 2, the longitudinal axes of the axles 46 and 49 are coincident.

The uppermost end of the pivot pin 45 carries a bell-crank lever 51 to the free end of one arm of which one end of a coupling rod 52 is pivotally connected. The opposite end of the coupling rod 52 is pivotally connected to one end of an arm 53 the opposite end of which is rigidly secured to the uppermost end of the pivot pin 48. The other arm of the lever 51 carries a vertical locking pin 56 at its free end, said locking pin being arranged to cooperate with any one of a row of holes 55 formed in a curved strip 54 that projects rearwardly from the frame beam 43. It will be evident that, by entering the tip of the locking pin 56 in a chosen one of the holes 55, the planes of rotation of the two ground wheels 47 and 50 will be retained in corresponding angular settings relative to the frame of the implement.

A support 57 projects forwardly from the frame beam 43 towards the end of that beam which is closest to the ground wheel 47, the support having a draw bar 58 turnably connected to it with the aid of a vertical pivot pin 59. The support 57 is formed with a curved row of holes 60 that are located at equal distances from the pivot pin 59 and the end of the draw bar 58 closest to the frame beam 43 is formed with a single hole (not visible in the drawings) that can be brought into register with any one of the holes 60. A vertical locking pin 61 is provided for entry through the hole in the draw bar 58 and the chosen one of the holes 60 to retain the draw bar 58 in a corresponding angular setting relative to the frame of the implement.

Three horizontal bearings 62 are provided on the lower side of the frame beam 40 and the ends of cranks 63 are entered in said bearings. The opposite ends of the cranks 63 have rake wheels 64 rotatably mounted thereon. Each crank 63 has a corresponding upwardly projecting arm 65 secured to it adjacent the portion thereof that is entered in the corresponding bearing 62. The uppermost ends of the arms 65 are pivotally connected to a coupling rod 66 by horizontal pivot pins 67 (FIGURE 3). It will be evident from FIGURE 3 of the drawings that the pivot pins 67 and bearings 62 are located at the corners of parallelograms.

The frame beam 42 has horizontal bearings 68, cranks 69, rake wheels 70, arms 71, a coupling rod 72 and pivot pins 73 connected to it, the parts which have just been mentioned being substantially identical in construction and arrangement to the corresponding parts 62, 63, 64, 65, 66 and 67 that have just been described.

A lug 74 is mounted on the upper side of the frame beam 40 and the lowermost end of an arm 76 is pivotally connected thereto with the aid of a horizontal pin 75. The uppermost end of the arm 76 is connected by a tension spring 82 to an anchorage towards the rearmost end of the coupling rod 66 and also, by a chain 83, a further tension spring 84 and a chain 85, to an anchorage at the leading end of the coupling rod 72.

A second lug 77 is mounted in the upper side of the frame beam 40 a short distance to the rear of the lug 74. One end of a cylinder 79 is turnably connected to the lug 77 by a horizontal pivot pin 78 and the cylinder receives a piston (not visible) the piston rod 80 of which projects from the end of the cylinder remote from the pivot pin 78. The projecting end of the piston rod 80 is turnably connected to the arm 76 at a point approximately midway along the length thereof with the aid of a horizontal pivot pin 81.

Each of the rake wheels 64 and 70 has a central disc or hub 89 and a felly 90 which is spaced therefrom by a plurality of spring steel or other torsionally deformable and radially extending spokes 88. Each spoke 88 is entered turnably through a corresponding hole in the felly 90 and at that point merges into an integral resilient tine. Each tine has a portion 87 which extends approximately tangentially away from the felly 90 in the intended direction of rotation of the rake wheel and a terminal crop-working portion 86 which is bent over so as to be inclined rearwardly relative to the direction of rotation just mentioned.

It is apparent from FIGURE 2 of the drawings that a vertical plane containing the points of contact of the tines of the three rake wheels 64 with the ground is parallel to, but not coincident with, a similar plane containing the points of contact of the tines of the rake wheels 70 with the ground. The two groups of rake wheels 64 and 70 will still operate in common to form a single windrow to the left of the rearmost rake wheel 70 relative to the direction A since the delivery point of the rearmost rake wheel 64 is wholly in the path of the foremost rake wheel 70. It is not, in fact, essential that the two rows of rake wheels 64 and 70 should be strictly parallel but the arrangement of the two groups which has been described permits the use of a simple frame formed substantially wholly from straight beams none of which needs to be arched over any of the rake wheels and all of which are located at a level below the level of the uppermost regions of the rake wheels. The two ground wheels 47 and 50 are located approximately centrally of the implement and thus support it in an effective and well balanced manner.

In the use of the implement which has been described with reference to FIGURES 2 and 3 of the drawings, it is moved in the direction indicated by the arrow A by a tractor or other propelling vehicle to which its drawbar 58 is connected. The position of the implement relative to the path of travel of the propelling vehicle is controlled by adjusting the locking mechanism that includes the locking pin 61 and the effective working width of the implement is controlled with the aid of the locking mechanism which includes the locking pin 56. A nonoperative transport position of minimum width is reached by adjusting the drawbar 58 and planes of rotation of the ground wheels 47 and 50 so that they extend approximately parallel to the frame beams 40 and 42.

The three rake wheels 64 are vertically movable in common independently of the three rake wheels 70 which are also movable vertically in common. If rake wheels 64 and 70 are employed that have resilient tines, such as those previously described, then the two groups of rake wheels will match ground undulations very effectively. The formation of the rake wheels into two cooperating groups is conducive to smooth and quiet operation of the implement, the smoothness of operation being further improved by the provision of the relatively large ground wheels 47 and 50 each of which has a diameter equal to approximately half the diameter of one of the rake wheels.

The fluid pressure cylinder 79 is preferably connected to the hydraulic system of the tractor or other vehicle used to propel the implement. A flexible pipe, one end of which can be seen in FIGURES 2 and 3 of the drawings adjacent the cylinder 79, may be entered through, or along, the beams 40 and 43 and the draw bar 58 to this end so that the driver of the tractor or other vehicle can control the pressure which the rake wheels 64 and 70 exert upon the ground by appropriate adjustment of the degree of extension of the piston rod 80 from the cylinder 79. It will be evident that this will cause the springs 82 and 84 to tend to alter the angularity of the parallelogram linkages which include the coupling rods 66 and 72 and that, when the implement is to be nonoperatively transported, the piston rod 80 can be extended to a maximum causing the rake wheels 64 and 70 to be raised entirely clear of contact with the ground.

Figure 4:
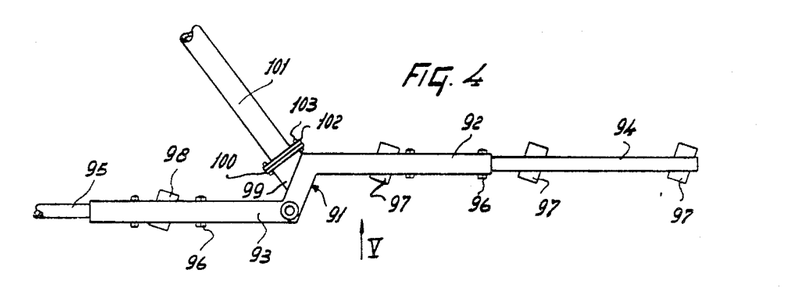
FIGURE 4 is a plan view showing the frame of a third embodiment of a raking implement in accordance with the invention.
Figure 5:
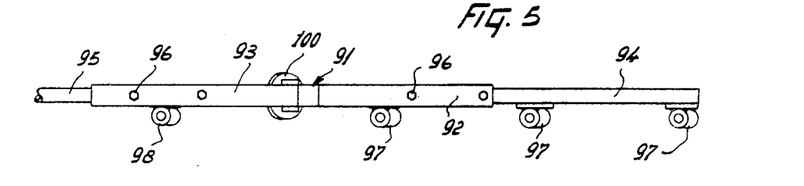
FIGURE 5 is a side elevation as seen in the direction indicated by the arrow V of FIGURE 4.

FIGURES 4 and 5 of the drawings illustrate the frame of a modified form of the implement described with reference to FIGURES 2 and 3, said frame being similar in shape to that of the frame previously described but being made in such a way that it can be taken to pieces.

The frame has a central portion 91 the two parallel but relatively offset limbs 92 and 93 of which are of inverted U-shaped cross-section. Bolts 96 are employed to retain the end of a beam 94 between the flanges of the limb 92 and the end of a beam 95 between the flanges of the limb 93. The lowermost side of the beam 94 has three horizontal bearings 97 fastened to it and the lowermost side of the beam 95 has three horizontal bearings 98 fastened to it. These bearings are similar to the previously described bearings 62 and 68. The central portion 91 has a connecting boss 99 projecting laterally from it, said boss 99 carrying a flange 100 at its free end. A beam 101, equivalent to the previously described beam 43, is formed at one end with a flange 102 and bolts 103 are employed to rigidly secure the flanges 100 and 102 to one another. The easy assembly and disassembly of the implement frame illustrated in FIGURES 4 and 5 is advantageous for storage, shipping and other transport purposes.

Figure 6:
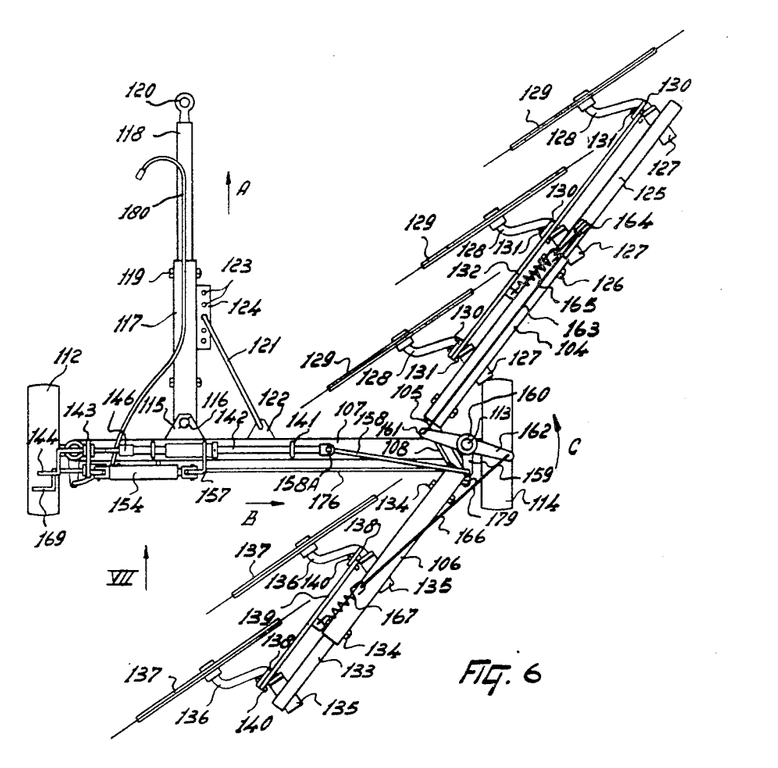
FIGURE 6 is a plan view of a fourth embodiment of a raking implement in accordance with the invention.
Figure 7:
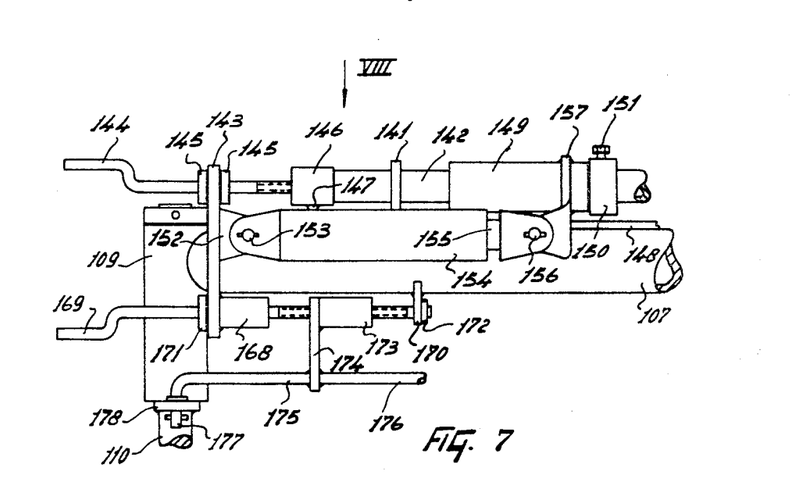
FIGURE 7 is a rear elevation view with parts broken away, to an enlarged scale, as seen in the direction indicated by the arrow VII of FIGURE 6.
Figure 8:
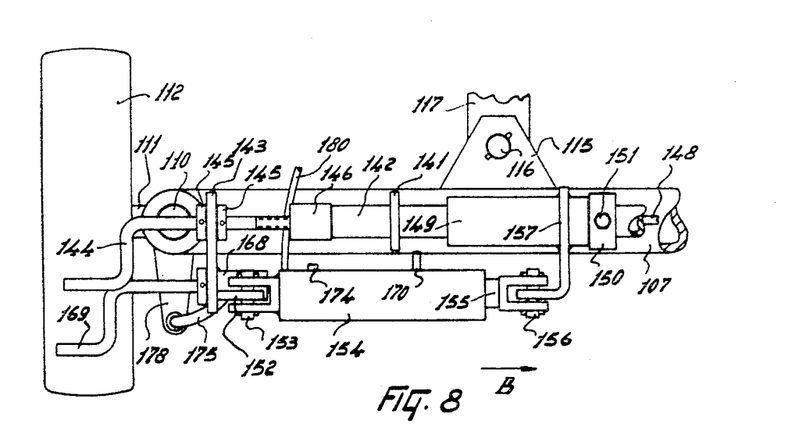
FIGURE 8 is a plan view as seen in the direction indicated by the arrow VIII of FIGURE 7.

The raking implement illustrated in FIGURES 6 to 8 of the drawings has two horizontal and parallel limbs 104 and 106 that are relatively offset by an inclined connecting part 105. The two limbs 104 and 106 are of inverted channel-shaped cross-section and the connecting part 105 has a flange 108 bolted to it. The flange 108 is secured to one end of a straight horizontal frame beam 107 which is inclined to the limb 104 at an angle of about 130°. As can be seen in FIGURE 6 of the drawings, the beam 107 normally extends perpendicular to the direction of operative travel of the implement which is indicated by the arrow A in that figure.

The end of the beam 107 remote from the flange 108 carries a vertical sleeve 109 in which a vertical shaft 110 is journalled. The lowermost end of the shaft 110 is integral with a horizontal axle 111 upon which a ground wheel 112 is rotatably mounted. A vertical bearing (not visible) is secured to the connecting part 105 at the side thereof remote from the flange 108 and a vertical shaft 113 is turnable in said bearing. The lowermost end of the shaft 113 is integral with a horizontal axle upon which a further ground wheel 114 is rotatably mounted. In the normal operating position of the implement which is shown in FIGURE 6 of the drawings, the longitudinal axes of the axles of the ground wheels 112 and 114 are substantially coincident.

A lug 115 projects forwardly from the beam 107 towards the end of that beam closest to the ground wheel 112. One end of a beam 117 of inverted channel-shaped cross-section is turnably connected to the lug 115 with the aid of a vertical pivot pin 116. A beam 118 of circular cross-section projects forwardly of the beam 117 from between the limbs thereof and is secured to the beam 117 with the aid of a transverse bolt 119. The leading end of the beam 118 is provided with an eye 120 adapted to co-operate with the tow bar or hitch of a tractor or other propelling vehicle. The parts 117 to 120 together constitute a draw bar the angular setting of which about the pin 116 is determined by means of a coupling rod 121 one end of which is pivotally connected to an anchorage lug 122 projecting forwardly from the beam 107 at approximately the mid-point thereof. The leading end of the coupling rod 121 can be entered in any one of a row of holes 123 formed in a horizontal plate 124 projecting from one side of the beam 117 to retain the drawbar in a corresponding angular setting about the pin 116.

A frame beam 125 of circular cross-section projects forwardly from the limb 104 between the flanges of which part of it is secured by bolts 126. Three horizontal bearings 127 are secured to the lowermost side of the beam 125, each bearing 127 having one end of a corresponding crank 128 entered therein the opposite end of which crank rotatably supports a corresponding rake wheel 129. Each crank 128 carries an upwardly projecting arm 130 at a point adjacent the portion thereof entered in the corresponding bearing 127. The arms 130 are similar to the previously described arms 65 and 71 and their uppermost ends are connected to a coupling rod 132 by way of three horizontal pivot pins 131. In a similar manner to the previously described embodiments, the bearings 127 and pivot pins 131 are located at the corners of parallelograms. The three rake wheels 129 are thus movable vertically in common relative to the frame of the implement upon changing the angularity of the parallelogram linkage.

A circular cross-section frame beam 133 projects rearwardly from the limb 106 between the flanges of which it is secured by bolts 134. Horizontal bearings 135, cranks 136, rake wheels 137, arms 138, a coupling rod 139 and pivot pins 140 are connected to the beam 133 and are constructed and arranged in a substantially identical manner to the parts 127 to 132 that have previously been described except that, in this case, the group of three rake wheels 129 is replaced by a pair of rake wheels 137.

A pair of eyes 141 project upwardly from the frame beam 107 and a rod 142 is axially displaceable therethrough parallel to, and above, said beam 107. A vertical plate 143 is secured to the end of the beam 107 remote from the flange 108 at right angles to the longitudinal axis of the beam 107 and a screwthreaded crank 144 has a plain portion of its shank entered therethrough. Rings 145 are rigidly secured to said plain portion on either side of the plate 143 so that the crank is rotatable, but axially immovable, relative to the plate 143. The screwthreaded portion of the crank 144 is entered in a correspondingly screw-threaded block 146 against which the end of the rod 142 normally abuts. It will be noted from FIGURES 7 and 8 of the drawings that the rod 142 is, in fact, of tubular construction thus allowing that part of the shank of the crank 144 which projects beyond the block 146 to be entered therein. A plate 147 (FIGURE 7) projects downwardly from the block 146 and is formed at its lowermost extremity with a notch (not visible). This notch cooperates slidably with a rail or keyway 148 rigidly secured to the uppermost side of the beam 107 so as to extend parallel to the latter. Therefore, upon rotation of the crank 144, the block 146 will be moved axially of the screw-threaded portion of the said crank in one direction or the other but will not be able to turn about said portion due to the cooperation of the plate 147 and rail or keyway 148.

A sleeve 149 surrounds the tubular rod 142 near the end thereof provided with the block 146, said sleeve 149 being slidable along the rod 142. A ring 150 also surrounds the rod 142 and can be retained in any chosen position axially thereof with the aid of a set bolt 151. The plate 143 carries a projecting vertical lug 152 to which the base of a fluid pressure cylinder 154 is turnably connected with the aid of a horizontal pivot pin 153. A piston rod 155 projects from the opposite end of the cylinder 154 and is connected by a horizontal pivot pin 156 to a lug 157 rigidly secured to the sleeve 149. The base of the lug 157 surrounds the sleeve 149 and is formed with a notch (not visible) that also cooperates with the rail or keyway 148 to prevent rotation of the sleeve 149 around the longitudinal axis of the rod 142.

The end of the rod 142 remote from the block 146 is pivotally connected by a vertical pin 158A (FIGURE 6) to one end of a coupling rod 158 the opposite end of which is pivotally connected to the free end of an arm 159. The arm 159 is rigidly secured to a sleeve 160 turnably mounted on the aforementioned vertical shaft 113. Two further diametrically opposed arms 161 and 162 project from the sleeve 160, the free ends of said arms being connected to anchorages on the coupling rods 132 and 139 by a rope, cable or the like 163 and a tension spring 165 and a rope, cable or the like 166 and a tension spring 167 respectively. The rope, cable or the like 163 is passed around a pulley 164 rotatably mounted immediately above the frame beam 125.

A plain horizontal sleeve 168 (FIGURES 7 and 8) is rigidly secured to the side of the plate 143 remote from the ground wheel 112. A plain portion of the shank of a crank 169 is entered through the sleeve 168 and a further plain terminal portion of said shank is entered through a hole in a lug 170 rigidly secured to the frame beam 107. Rings 171 and 172 are rigidly secured to the respective plain portions of said shank on relatively opposite sides of the plate 143 and the lug 170 so that the crank 169 can rotate about the axis of its shank but not move in a direction parallel thereto. The shank of the crank 169 has a screwthreaded portion located between the plain portions mentioned above and a correspondingly screwthreaded sleeve 173 is mounted thereon. A downwardly projecting arm 174 is rigidly secured to one end of the sleeve 173 and the opposite ends of axially aligned rods 175 and 176 that extend parallel to the beam 107 throughout the greater parts of their lengths are rigidly secured to opposite sides of the lowermost end of the arm 174. As can be seen in FIGURES 7 and 8 of the drawings, an end portion 177 of the rod 175 is bent over downwardly and pivotally lodged in a hole at the free end of an arm 178 projecting rigidly from the vertical shaft 110 immediately beneath the vertical sleeve 109. As can be seen in FIGURE 6 of the drawings, an end portion of the rod 176 is pivotally engaged in a similar manner with an arm 179 that is rigidly secured to the shaft 113 below the bearing (not visible) corresponding to the bearing 109. It is noted that the rods 175 and 176 have sufficient flexibility to resiliently accommodate the deformation thereof which tends to take place upon angular adjustment of the planes of rotation of the ground wheels 112 and 114.

As in the cases of the implements which have previously been described, the implement illustrated in FIGURES 6 to 8 of the drawings will function as a side-delivery rake when it is towed over the ground in the direction A by a tractor or other propelling vehicle to which the eye 120 of its drawbar is coupled. By engaging the end of the coupling rod 121 in different ones of the holes 123, the path of travel of the implement relative to that of the tractor or other propelling vehicle can be varied. The working width of the implement is adjusted by altering the angular settings of the planes of rotation of the ground wheels 112 and 114 relative to the frame. This is accomplished by manually rotating the crank 169 in one direction or the other, this movement causing the sleeve 173 and rods 175 and 176 to move axially with a consequent angular displacement of the shafts 110 and 113 about their own longitudinal axes. The ground wheels 112 and 114 can be brought to settings in which their planes of rotation extend approximately parallel to the limbs 104 and 106. In this setting, the path of travel of the implement is at its minimum width which is advantageous for nonoperative transport of the implement.

The three rake wheels 129 are movable vertically in common relative to the frame of the implement independently of the two rake wheels 137 which are themselves movable vertically in common relative to said frame. This is conducive to quiet operation of the implement which is also assisted by giving the ground wheels 112 and 114 a relatively large diameter equal to approximately half the diameter of one of the rake wheels 129 or 137.

The cylinder 154 can be connected to the hydraulic system of the tractor or other propelling vehicle by way of a flexible pipe 180 extending along the draw bar. Upon supplying oil or other fluid under pressure to the cylinder 154, the piston rod 155 is caused to move in the direction indicated by the arrows B in FIGURES 6 and 8 of the drawings. The sleeve 149 slides into contact with the ring 150 thus entraining the rod 142 which, through the intermediary of the coupling rod 158 and arm 159 turns the two arms 161 and 162 about the shaft 113 in the direction indicated by the arrow C in FIGURE 6 of the drawings. The ropes, cables or the like 163 and 166 stretch the springs 165 and 167 which, in turn, tend to move the coupling rods 132 and 139 forwardly of the implement in directions parallel to the limbs 104 and 106. This tends to alter the angularity of the parallelogram linkages of which the coupling rods 132 and 139 form parts and to reduce the pressure with which the tines of the rake wheels 129 and 137 bear against the surface of the ground. If the piston rod 155 is displaced to its maximum extent in the direction B, the rake wheels 129 and 137 will be brought entirely clear of contact with the ground so that the implement can be nonoperatively transported without difficulty.

If the fluid pressure in the cylinder 154 is allowed to drop, then the rake wheels 129 and 137 will move downwardly into contact with the ground under gravity and the various parts which were described as moving in the directions B and C respectively will move back in relatively opposite directions. This brings the end of the tubular rod 142 back into contact with the block 146 which thus forms an adjustable stop in respect to downward displacement of the rake wheels 129 and 137. Moreover, the block 146 can be moved in the direction B by the crank 144 to raise the rake wheels 129 and 137 entirely clear of contact with the ground, or to any intermediate position, at times when the power-operated means afforded by the cylinder 154 cannot be employed. In view of the fact that the mechanisms for angularly adjusting the planes of rotation of the ground wheels 112 and 114 relative to the frame and for raising and lowering the rake wheels 129 and 137 relative thereto extend along the frame beam 107 substantially perpendicular to the intended direction of operative travel of the implement, said mechanisms do not project from the implement and do not detract from its relatively simple and compact construction.

The parallel but nonaligned arrangement of the beams of the implement that support its rake wheels allows the frame to be substantially uniplanar and to be formed principally from straight beams. The fact that the frame can be readily taken to pieces in a similar manner to the frame described with reference to FIGURES 4 and 5 of the drawings is very advantageous in regard to storage, shipping and otherwise transporting the implement.

We claim:
1. An implement comprising a side-delivery rake having a frame supporting a row of relatively overlapping rake wheels inclined to the intended direction of operative travel of the implement, the rake wheels of said row being arranged in two separate groups, the rake wheels of each group being connected to a corresponding frame beam, said supporting frame beams extending parallel or substantially parallel to one another, the foremost end of the rear frame beam and the rearmost end of the leading frame beam being interconnected by a relatively inclined part, the planes of rotation of at least some of said rake wheels of a leading group being parallel to the planes of rotation of at least some of the rake wheels of a trailing group, and in rectilinear nonalignment therewith, the distance between the point of contact with the ground of the rearmost rake wheel of said leading group and the point of contact with the ground of the leading rake wheel of said trailing group being greater than the distance between the points of contact with the ground of two neighboring rake wheels of either group.

2. An implement as claimed in claim 1, wherein the frame of the implement is supported by two ground wheels arranged centrally or approximately centrally of the implement relative to the extent thereof in the intended direction of travel, a draw bar being coupled to said frame, said draw bar being turnable about a vertical or substantially vertical axis relative to said frame, said axis being located in front of the rake wheels and near the line connecting the centers of said ground wheels and means for retaining said draw bar in any one of a number of different angular settings about said axis.

3. An implement as claimed in claim 1, wherein the rake wheels are pivotally connected to the frame through the intermediary of cranks, the cranks of at least one group being pivotally interconnected by a coupling rod and being vertically displaceable, only in common, relative to the frame of the implement.

4. An implement comprising a side-delivery rake having a frame supporting a row of relatively overlapping rake wheels inclined to the intended direction of operative travel of the implement, said rake wheels being arranged in two separate groups, each rake wheel being pivotally connected to the frame through the intermediary of a crank, the cranks of each group of rake wheels being provided with projecting arms which are pivotally connected to a coupling rod, the frame of said implement being supported by two ground wheels arranged approximately centrally of the implement relative to the extent thereof in the intended direction of operative travel, the rake wheels of each group being interconnected and movable, only in common, vertically relative to the frame of the implement independently of the rake wheels of the other group, lifting means on said frame for raising said groups of rake wheels, said lifting means being connected to each coupling rod through a spring.

5. An implement as claimed in claim 4, wherein ground wheels are arranged near relatively opposite ends of a supporting frame beam that extends transverse to the intended direction of operative travel of the implement.

6. An implement comprising a side-delivery rake having a frame which includes a beam extending transverse to the intended direction of operative travel of the implement, ground wheels located adjacent the relatively opposite ends of said transverse beam, said beam being substantially straight and being located at a level below that of the uppermost regions of the rake wheels of the frame, the opposite ends of said beam being located at relatively opposite sides of the row of rake wheels, one group of rake wheels being arranged in front and a further group behind said beam, the points of contact of the rake wheels of the leading group with the ground being contained in a vertical plane which is located forwardly of a vertical plane containing the points of contact of the rake wheels of the rear group with the ground and the rake wheels of each group being connected to a corresponding supporting frame beam, and wherein said supporting frame beams extend substantially parallel to one another.

7. An implement as claimed in claim 5, wherein a lifting mechanism is provided for lifting said rake wheels, said lifting mechanism being positioned at least in part on said transverse frame beam that extends substantially perpendicular to the intended direction of operative travel of the implement.

8. An implement as claimed in claim 6, wherein the two supporting frame beams comprise leading and trailing beams interconnected by a relatively inclined part which extends between the rearmost end of the leading frame beam and the foremost end of the rear frame beam.

9. An implement as claimed in claim 8, wherein one end of said transverse beam is fastened to said relatively inclined part.

10. An implement as claimed in claim 8, wherein ground wheels support the frame and the planes of rotation of said ground wheels are angularly displaceable about substantially vertical axes.

11. An implement as claimed in claim 10, wherein shafts comprise said substantially vertical axes which are interconnected by a coupling rod and means provided for retaining the planes of rotation of the ground wheels in chosen angular settings about said axes.

12. An implement as claimed in claim 8, wherein a draw bar is connected to said transverse frame beam at a location adjacent one end thereof remote from said relatively inclined part.

13. An implement as claimed in claim 12, wherein the draw bar is angularly adjustable relative to the frame of the implement about a substantially vertical axis, and means are provided to retain it in any one of a number of different angular settings about said axis.

14. An implement as claimed in claim 5, wherein each group of rake wheels is provided with a spring mechanism for adjusting the pressures with which the rake wheels of the group bear against the ground.

15. An implement as claimed in claim 5, wherein each rake wheel is pivotally connected to the frame through the intermediary of a crank, the cranks of each group of rake wheels being provided with projecting arms which are pivotally connected to a coupling rod.

16. An implement as claimed in claim 5, wherein the rake wheels are mounted on cranks and a hydraulic mechanism is connected to said cranks for raising the rake wheels.

17. An implement as claimed in claim 7, wherein the lifting mechanism includes a fluid pressure operable piston and cylinder and said piston is connected to said wheel cranks.

18. An implement as claimed in claim 17, wherein the lifting mechanism comprises a rod arranged to be axially displaceable along said transverse frame beam, the rod being coupled to the piston and cylinder and to the wheel cranks.

19. An implement as claimed in claim 18, wherein said rod is coupled to an arm turnable about a substantially vertical axis, said arm being linked to the rake wheels by coupling members that extend along the supporting beam to which the rake wheels are connected.

20. An implement as claimed in claim 18, wherein a stop is arranged to cooperate with said rod, said stop being mounted to be displaceable with the aid of a screw-threaded spindle.

21. An implement as claimed in claim 7, wherein ground wheels are arranged near relatively opposite ends of the transverse frame beam, said ground wheels having turnable mountings interconnected by a coupling rod extending substantially parallel to said transverse frame beam.

22. An implement as claimed in claim 21, wherein the coupling rod is displaceable axially by a screw-threaded spindle extending substantially parallel thereto.

23. An implement comprising a side-delivery rake having rake wheels connected to a supporting beam through cranks, said beam being inclined to the intended direction of operative travel, a lifting mechanism being provided for lifting said rake wheels, the lifting mechanism including a fluid pressure operable piston and cylinder and said piston being connected to said wheel cranks by means of an axially displaceable rod, said rod being surrounded by a relatively axially slidable sleeve to which the piston and cylinder are connected, said sleeve cooperating with a stop arranged to be movable to and retainable in any one of a number of different positions located axially of said rod.

24. An implement comprising a frame supported by two ground wheels, a row of rotatable rake wheels carried by said frame which is located at the level of the hubs of the rake wheels, said row of rake wheels extending forwardly and rearwardly of said two ground wheels when seen in side view, a ground wheel being located at each side of said row of rake wheels, said ground wheels being connected to each other by a transverse frame beam passing between two consecutive rake wheels, the ground wheels being located near the ends of the said frame beam, the rake wheels which are located in front of said transverse beam being connected to a supporting frame beam which extends parallel or substantially parallel to a supporting frame beam for the rake wheels, which are located behind said transverse beam, said supporting frame beams which are located behind the rake wheels being interconnected by a relatively inclined part which extends between the rearmost end of the leading frame beam and the foremost end of the rear frame beam, one end of said transverse beam being fastened to said relatively inclined part and a draw bar being coupled to a part of said transverse frame beam, said part being located forwardly of said row of rake wheels relative to the intended direction of travel.

25. An implement as claimed in claim 24, wherein said draw bar is turnable about a substantially vertical axis relative to said frame, means for retaining said draw bar in any one of a number of different angular settings about said axis.

26. A side-delivery rake having a frame supporting a row overlapping rake wheels inclined to the intended direction of operative travel, the rake wheels of said row being arranged in a leading and a trailing group, each group of rake wheels being connected to a corresponding supporting frame beam located behind the rake wheels and extending substantially parallel to one another, the two supporting frame beams being interconnected by a relatively inclined part which extends between the rearmost end of the leading frame beam and the foremost end of the rear frame beam, the planes of rotation of at least some of the rake wheels of said leading group being parallel to the planes of rotation of at least some of the rake wheels of said trailing group and in rectilinear non-alignment therewith, the distance between the point of contact with the ground of the rearmost rake wheel of said leading group and the point of contact with the ground of the leading rake wheel of said trailing group being greater than the distance between the points of contact with the ground of two neighboring rake wheels of either group, said frame being located at the level of the hubs of said rake wheels and supported by two ground wheels, one of said ground wheels being located at each side of said row of rake wheels, said ground wheels being connected to each other by a transverse frame beam passing between the hindmost rake wheel of said leading group and the foremost rake wheel of said trailing group, said ground wheels being located near the ends of said frame beam, one end of said transverse beam being fastened to said relatively inclined part.

27. An implement as claimed in claim 26, wherein a line of connection between the points of contact with the ground of the rearmost rake wheel of said leading group and the leading rake wheel of said trailing group extends obliquely rearwards relative to the intended direction of operative travel of the implement from a line of connection between the points of contact with the ground of the rake wheels of said leading group.

28. An implement as claimed in claim 27, wherein the rake wheels of at least one group are interconnected and vertically displaceable, in common, relative to said frame.

29. An implement as claimed in claim 27, wherein the rake wheels of either group are interconnected and movable in common, vertically relative to said frame independently of the rake wheels of the other group.

References Cited

UNITED STATES PATENTS

| | | |
|---|---|---|
| 2,844,935 | 7/1958 | Cooley _______________ 56—377 |
| 2,933,879 | 4/1960 | Van der Lely et al. ____ 56—377 |
| 2,975,583 | 3/1961 | Van der Lely et al. ____ 56—377 |
| 3,006,132 | 10/1961 | Van der Lely et al. __ 56—377 X |
| 3,015,202 | 1/1962 | Van der Lely et al. ____ 56—377 |
| 3,101,584 | 8/1963 | Van der Lely et al. ____ 56—377 |
| 3,167,900 | 2/1965 | Wood _______________ 56—377 |
| 3,176,457 | 4/1965 | Van der Lely et al. ____ 56—377 |
| 3,320,735 | 5/1967 | Sutherland et al. ______ 56—377 |

ANTONIO F. GUIDA, Primary Examiner

P. A. RAZZANO, Assistant Examiner